Patented Oct. 5, 1948

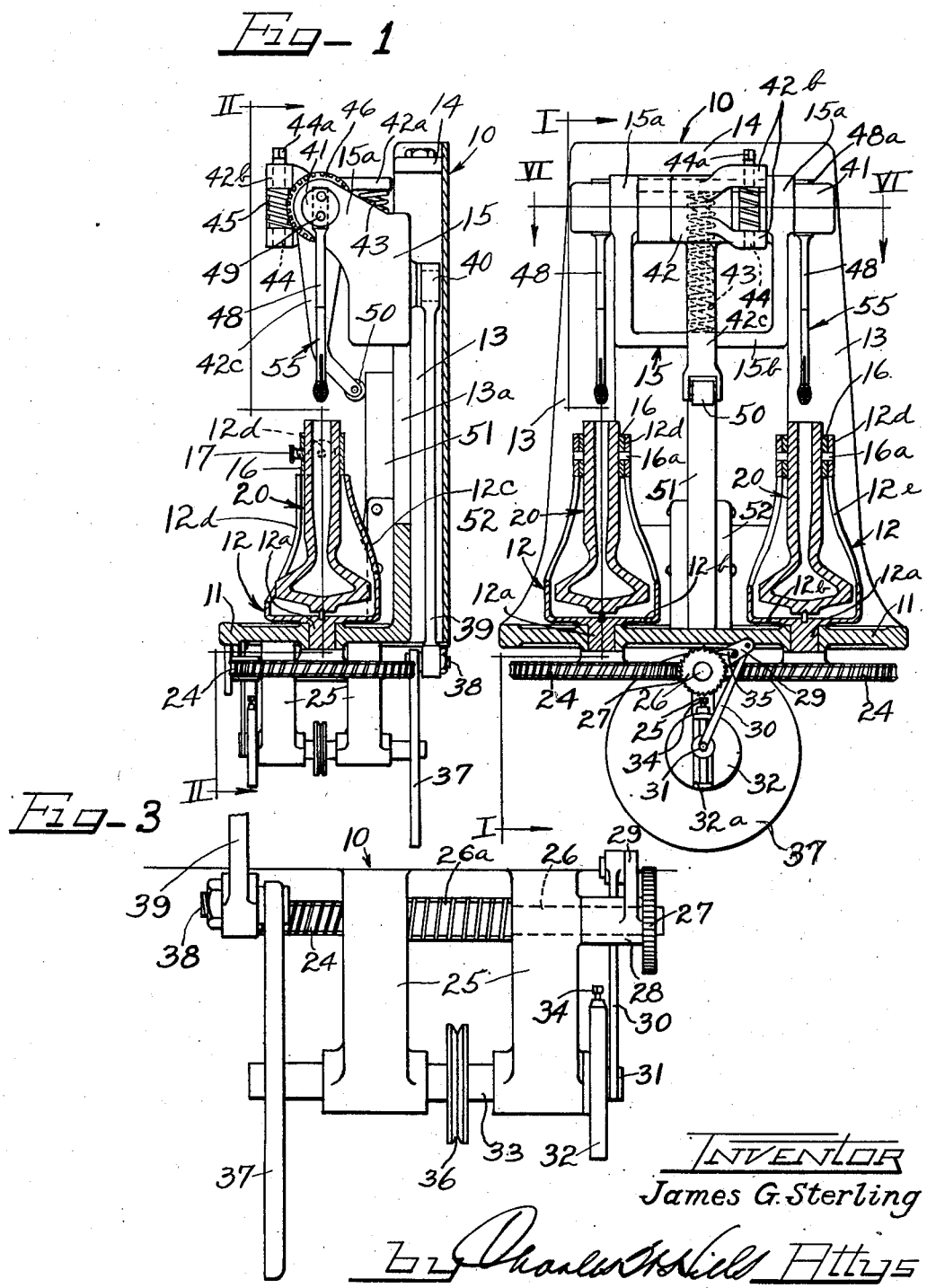

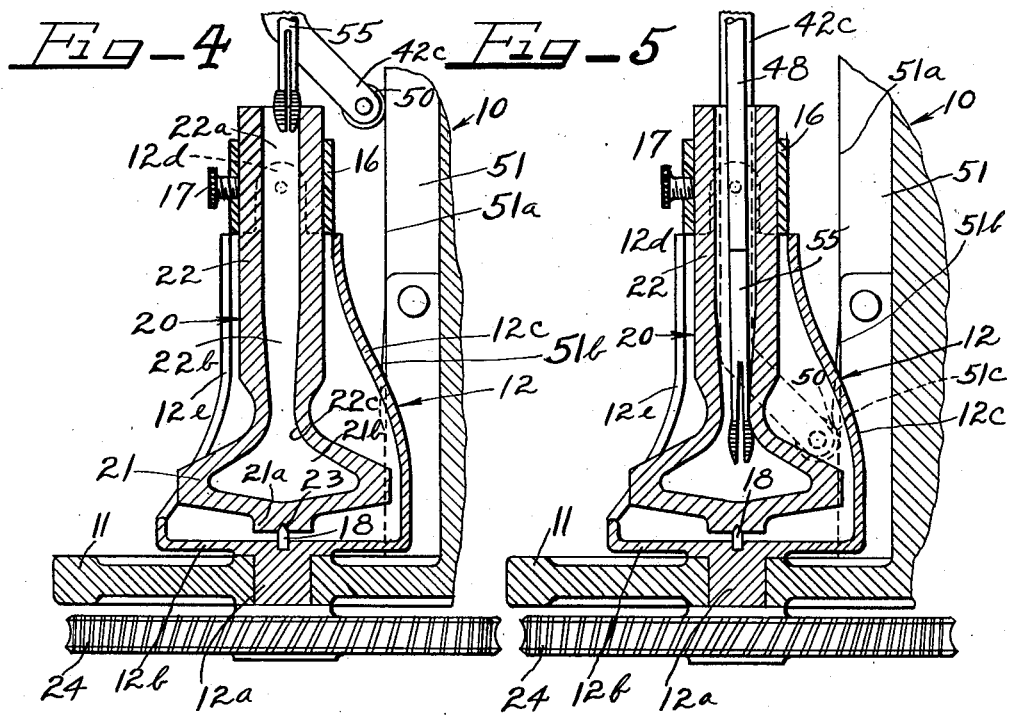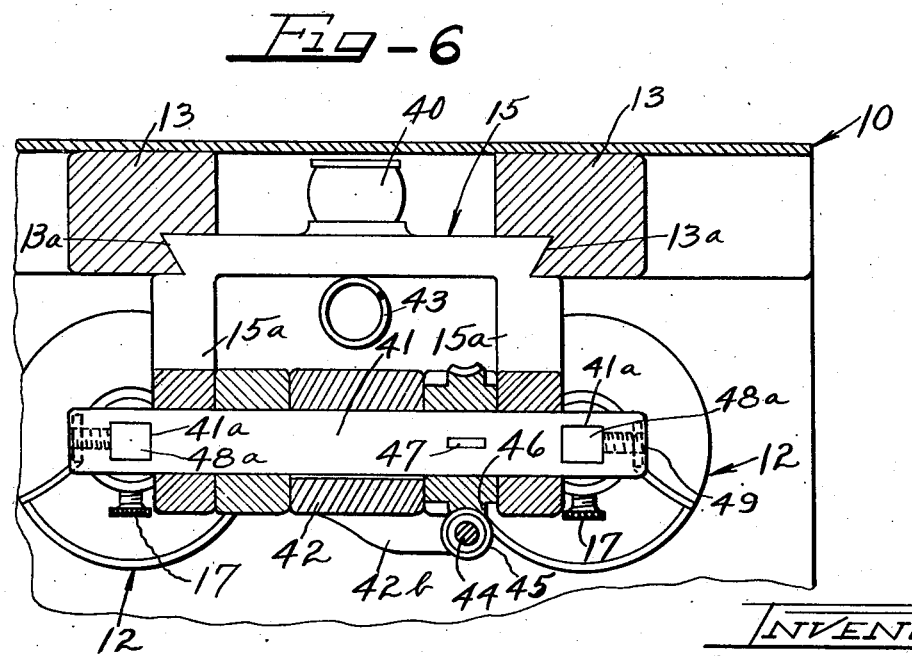

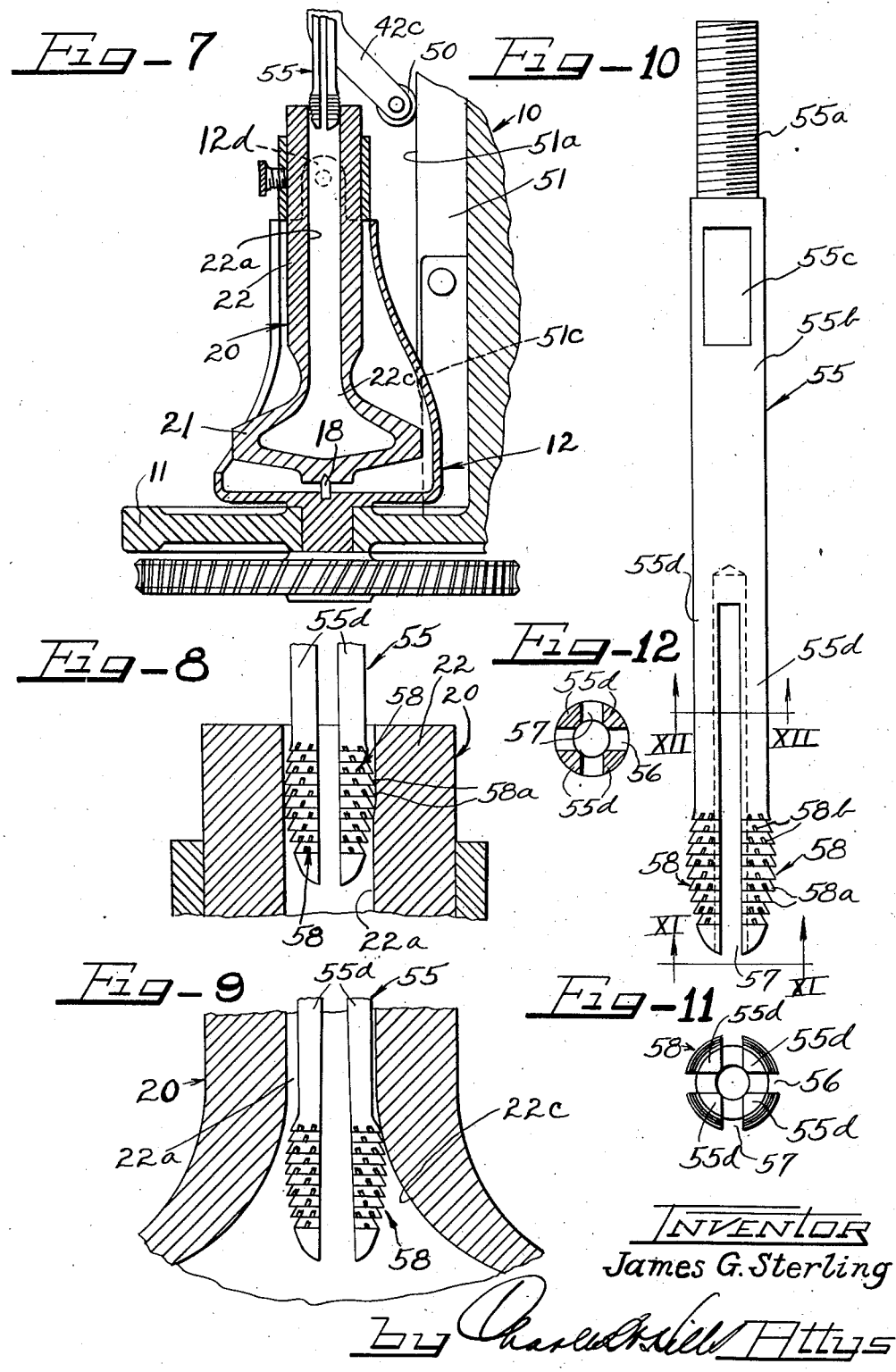

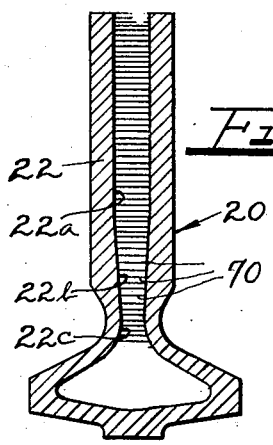
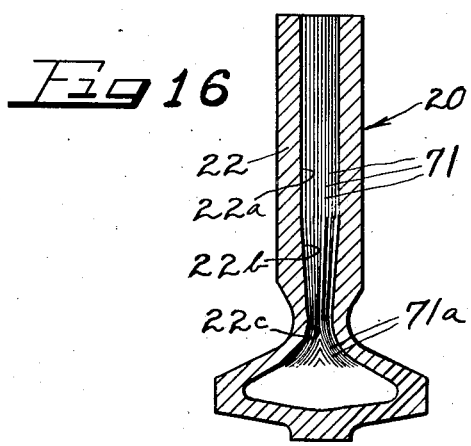
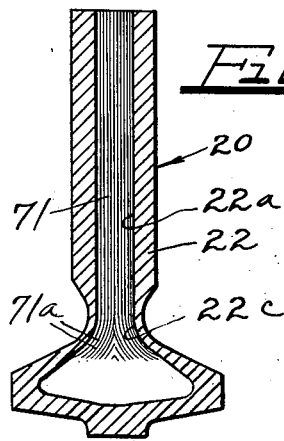
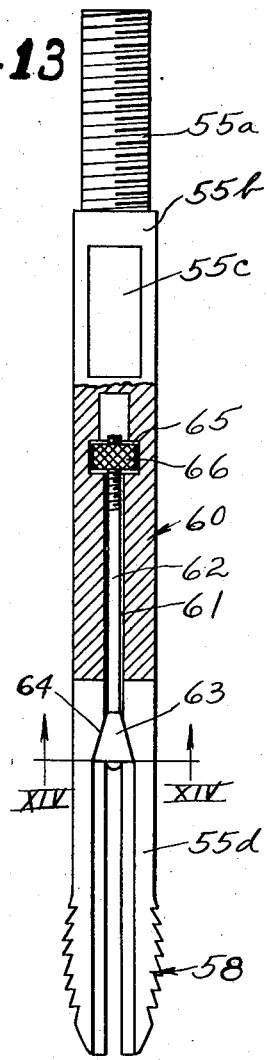
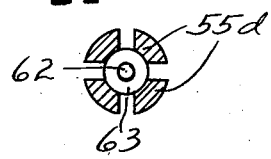

2,450,817

UNITED STATES PATENT OFFICE 2,450,817

PROCESS FOR REMOVAL OF ANNULAR SCRATCHES IN HOLLOW POPPET VALVE STEMS

James G. Sterling, Cleveland Heights, Ohio, assignor to Thompson Products, Inc., a corporation of Ohio Application March 6, 1944, Serial No. 525,274

7 Claims. (Cl. 29—76)

1

This invention relates to methods of destroying and removing machining or tool marks in metal articles and especially interior walls of articles such as hollow stem poppet valves.

Specifically, the invention relates to the axial filing of valve stem interiors to remove all traces of tool marks other than axial marks, so that loci for fatigue cracks are eliminated.

The invention will be specifically described in connection with the filing of interiors of hollow poppet valve stems, but it should be understood that the invention is not limited for use on any specific metal article, since it is generally applicable to the filing of metal, and especially interior metal surfaces to finish these surfaces.

In the production of hollow poppet valves, austenitic steels are used which tear quite easily, and reaming, drilling, and grinding operations leave tool marks in the surface of the steel. Elaborate polishing operations are generally found necessary to remove these tool marks, because the presence of such marks in the finished poppet valves is quite dangerous, due to the fact that any scratch, no matter how minute, might form a fatigue locus during use of the valve, resulting in valve failure. Since the poppet valve stem, in operation, is subjected mainly to tensile stresses, circumferential scratches or annular scratches in the stem wall are especially dangerous. Such circumferential or annular scratches can readily form the loci for circumferential cracks in the valve stem and, when the valve stem is subjected to heavy axial stresses and shocks as the valve opens and closes in an engine, any crack therein soon results in failure. The repeated pounding at tremendous speed which the valve stem must undergo in high speed, high compression engines, such as aircraft engines, has greatly increased the potential dangers of circumferential scratches.

Hollow poppet valves are partially filled with coolant, such as sodium, for dissipating heat from the head of the valve down through the length of the valve stem. Now, since rapid heat transfer is especially desirable to maintain the valve as cool as possible in operation, the valves are made with relatively thin walls, and these thin walls must carry the loads mentioned above. It is thus quite obvious that the stem part of the valve must be made as fatigue resistant as possible so as to successfully resist all strains to which it is subjected.

The valve stem in operation is only subjected to negligible stresses tending to radially expand it, and therefore the valve stem is designed to resist

2 the higher tension stresses and, when so designed, it will not fail because of any of the lesser radial stresses to which it is subjected.

In accordance with this invention a file or burr is held in line contact with the interior wall of a valve stem and is reciprocated axially along the length of the stem to remove any annular scratch or tool mark lying along the line of contact. At the top of the filing stroke when the file is not in contact with the valve stem, the valve is rotated so that the next filing operation will be in an axial line immediately adjacent and parallel to the previously filed line. Of course, line contact between the file and stem wall may actually be in the nature of a narrow band area contact. Reciprocal filing alternated with indexed step-by-step rotation of the valve between the filing strokes is continued until the entire circumference of the stem wall has been filed and the last traces of circumferential or annular scratches removed from this wall. While the filing may leave axial scratches in the stem wall, these scratches are not dangerous, as explained above.

According to the preferred process of this invention, the file is in the nature of a bulbous metal burr which is cross-split to provide four resilient file fingers. One or more of the fingers is urged against the valve stem wall under controlled pressure to regulate the depth of cut to be taken by the file. At the same time, however, the other fingers ride on the stem wall and serve to resiliently back up the active filing finger or fingers and guide the same on the stem wall. This arrangement constrains the file to follow the original hole in the valve stem. Since some valves have straight holes extending into the stem for a predetermined distance, and then tapering into a small hole before entering the head cavity, and since varying wall thickness of the valve must be accurately maintained, in accordance with this invention, the file or burr is pivotally mounted and its path of reciprocating travel is controlled by a cam and follower arrangement.

The use of a resilient burr head, in accordance with the preferred embodiment of this invention, also makes possible the finishing of the hollow throat of the valve since the burr head can expand into the larger cavity of the valve head and file-finish the throat as it expands.

It is, then, an object of this invention to remove, by reciprocal filing treatments, all annular scratches and tool marks from the interiors of hollow metal articles.

It is a further object of this invention to increase the fatigue resistance of thin walled hollow stemmed metal poppet valves by filing off metal from the interiors of the hollow stems of the valves.

A still further object of the invention is to increase the tensile strength of hollow stemmed poppet valves by filing the stem interiors in an axial direction.

A still further object of the invention is to provide a filing process wherein elongated narrow bands of the article being treated are successively filed until the entire surface to be treated has been acted on by the file.

Another object of the invention is to provide a filing process wherein a metal wall defining a blind hole has narrow, elongated band areas thereof successively acted on by a resilient cutting file while other areas of the same file guide the file in the hole.

A specific object of the invention is to reciprocate a file in the hollow stem of a valve and guide the reciprocating file along a path conforming with the contour of the stem hole.

Another object of the invention is to finish the throat of a hollow poppet valve and remove all annular scratches therefrom.

Other and further objects of the invention will be apparent to those skilled in the art from the following detailed description of the annexed sheets of drawings which, by way of preferred examples only, illustrate several embodiments of the invention.

On the drawings:

Figure 1 is a transverse vertical cross-sectional view, with parts in side elevation, of apparatus suitable for carrying out the process of this invention and taken along the line I—I of Figure 2.

Figure 2 is a front elevational view, with parts in vertical cross section, of the apparatus of Figure 1, taken along the line II—II of Figure 1.

Figure 3 is an enlarged fragmentary side elevational view of the lower portion of the apparatus shown in Figures 1 and 2.

Figure 4 is an enlarged fragmentary vertical cross-sectional view, with parts in elevation, illustrating the apparatus for filing a tapered hole hollow poppet valve with the file at the beginning of its filing stroke but about one inch below the top of its full stroke.

Figure 5 is a view similar to Figure 4 with the file at the end of its stroke.

Figure 6 is an enlarged horizontal cross-sectional view with parts in elevation, taken along the line VI—VI of Figure 2.

Figure 7 is a view similar to Figure 4 illustrating the filing of a straight hole hollow poppet valve.

Figure 8 is an enlarged fragmentary vertical cross-sectional view, with parts in side elevation, amplifying the action of the file on the valve of Figure 7 at the start of the filing stroke.

Figure 9 is a view similar to Figure 8 but amplifying the position of the file at the end of the filing stroke.

Figure 10 is a side elevational view of a resilient burr-type file used in the process of this invention.

Figure 11 is a plan view of the file of Figure 10, taken along the line XI—XI of Figure 10.

Figure 12 is a transverse cross-sectional view taken along the line XII—XII of Figure 10.

Figure 13 is a side elevational view of a file similar to the file of Figure 10 but equipped with an expander for the resilient fingers.

Figure 14 is a transverse cross-sectional view taken along the line XIV—XIV of Figure 13.

Figure 15 is an axial cross-sectional view of a valve with a tapered hole illustrating annular scratches and tool marks which are removed in accordance with this invention.

Figure 16 is an axial cross-sectional view of the valve of Figure 15 after the stem hole and throat have been filed in accordance with this invention.

Figure 17 is an axial cross-sectional view of a valve with a straight hole after the hole has been filed in accordance with this invention.

As shown on the drawings:

In Figures 1 to 7 inclusive the reference numeral 10 designates generally apparatus for carrying out the filing process of this invention. The apparatus 10 has a horizontal base 11 rotatably supporting valve carriages 12, 12. The carriages 12, 12 have hubs 12a rotatably mounted in the base 11. The machine 10 also has spaced opposed vertical guide posts or columns 13, 13 connected at their tops by a tie bar 14 and providing ways 13a, 13a for carrying a vertically movable carriage 15, as best shown in Figure 6.

As shown in Figure 2, the valve carriages 12, 12 are mounted in laterally spaced relation on the base 11 of the apparatus and have base portions 12b from which the cylindrical lugs or hubs 12a depend through apertures in the plate 11. The carriages 12 also have back walls 12c extending upwardly from the bases 12b. The supports 12 have open front faces 12e. Spaced opposed ears 12d project from the top of each support 12 and tiltably carry a sleeve 16. As shown in Figure 2, the sleeve 16 has trunnions or pins 16a projecting laterally therefrom which are swively mounted in the ears 12d.

A set screw 17 is threaded through the sleeve 16 in the front side thereof.

A pin 18 is secured in each support 12 in the bottom 12b thereof and this pin has a pointed top end.

A poppet valve blank 20 is fixedly secured in each support 12. Each blank 20 has a head portion 21 and a cylindrical stem portion 22. The head portion 21, as best shown in Figure 4, has a lug 21a on the dome thereof with a recess 23 receiving the pointed end of the pin 18.

In order to mount a valve blank 20 in its carriage 12, the set screw 17 is retracted in the sleeve 16, the sleeve 16 is tilted to move the bottom end thereof through the front open face 12e of the carriage, the stem portion 22 of the valve 20 is inserted into the sleeve, the sleeve with the valve stem therein is then tilted to a vertical position for moving the valve head 21 into the carriage 12 and the hole 23 on the lug 21a of the valve head is positioned to receive the pointed end of the pin 18. When the pin 18 is seated in the hole 23 the set screw 17 of the sleeve is tightened against the stem 22 and the valve 20 is thus fixedly mounted in the support 12 for corotation therewith.

Each hub 12a of a carriage 12 projects through the mounting base 11 and receives a worm wheel 24 thereon.

Legs 25 depend from the base 11 and rotatably support a shaft 26 with a worm 26a (Figure 3) thereon between the worm wheels 24 in toothed engagement with the wheels for rotating the same.

A ratchet 27 is secured on the shaft 26 and a sleeve member 28 free on the shaft 26 has an arm 29 driven by a link 30 from an adjustable cross head 31 carried by a disk 32 on a shaft 33 also carried by the supports 25. The disk 32 has ways 32a thereon as shown in Figure 2 adjustably mounting the cross head 31 and this cross head is adapted to be set in any desired eccentric position relative to the center of the disk 32 by means of an adjusting screw 34.

A pawl 35 (Figure 2) is pivoted on the arm 29 and engages the ratchet 27 for driving the shaft 24 in one direction only as the arm is reciprocated by the link 30. The amount of movement of the shaft can be controlled by the eccentric setting of the cross head 31.

The shaft 33 is adapted to be driven from a prime mover (not shown) having engagement with a pulley 36 on the shaft between the supports 25.

The shaft 33 has a second disk 37 mounted on the opposite end thereof as best shown in Figures 1 and 3 and this disk 37 has a pin 38 spaced from the center thereof which reciprocates a link or connecting rod 39. The connecting rod 39 extends between the columns 13, 13 and is pivotally connected to the carriage 15 as at 40 (Figures 1 and 6). Rotation of the disk 37, of course, reciprocates the link 39 and thus moves the carriage 15 up and down on the ways 13a.

As shown in Figures 1 and 6, the carriage has forwardly projecting side arms 15a at the upper end thereof providing bearing supports for a shaft 41. This shaft 41 loosely carries a sleeve or boss 42 between the arms 15a and the sleeve has a rearwardly projecting tail portion 42a (Figure 1) acted on by a spring 43 which is bottomed on a bottom wall 15b of the carriage 15. The spring 43 is a coiled compression spring and serves to force the tail 42a of the sleeve 42 in an upward direction.

The sleeve 42 also has arms 42b projecting forwardly and laterally therefrom in spaced superimposed relation. The ends of these arms 42b form bearings rotatably supporting a vertical shaft 44, the upper end of which projects above the top arm 42b and is headed as at 44a for receiving a wrench or turning tool. A worm 45 is secured on the shaft between the arms 42b and meshes with a worm wheel 46 keyed on the shaft 41 as by means of a key 47 (Figure 6).

The spring 43, in urging the tail piece 42a in an upward direction, thus tends to rotate the shaft 41 in a counterclockwise direction as viewed in Figure 1 and the spring pressure exerted on the shaft 41 to cause such rotation can be readily controlled by rotation of the worm 45. Likewise, the neutral position of the shaft 41 can be adjustably selected by rotation of the worm 45.

The ends of the shaft 41 project beyond the arms 15a of the carriage and have square or rectangular holes 41a therethrough receiving the square or rectangular end portions 48a of rods 48. Set screws 49 are threaded axially into the ends of the shaft 41 for locking the ends 48a of the rods 48 in the apertures 41a.

As best shown in Figures 1 and 2, the sleeve 42 also has an integral depending finger 42c carrying a cam roller 50 at the lower end thereof. A vertical cam 51 is fixedly carried from the base 11 by supports 52. The cam opposes the spring 43 and causes the shaft 41 to rock as determined by the contour thereof.

The rods 48 have internally threaded socket ends receiving files or burrs 55. As best shown in Figures 10 to 12, the file 55 includes a reduced-diameter threaded end portion 55a, a cylindrical shank portion 55b having a flat spot 55c thereon providing an engagement face for a wrench so that the threaded end 55a can be tightened in the socket end of the rod 48, and four resilient fingers or prongs 55d. The fingers 55d are separated by cross slots 56 and 57 and each has a lower bulbous end portion 58. Each portion 58 has a plurality of annular grooves therearound providing sharp cornered shoulders 58a in spaced superimposed relation and each tapered wall of a shoulder has a plurality of file slots 58b cut therein. The ends 58 may be defined as quarter sections of a burr head each having formed on the annular outer face thereof cutting teeth or file marks. Each burr section 58 is formed on the end of an individual resilient finger 55d carried from a single main shank 55b.

As best shown in Figures 4 and 5, the stem 22 of the valve blank 20 has a straight cylindrical bore 22a extending inwardly from the end thereof to a tapered bore 22b which converges toward an outwardly flaring neck cavity 22c. The neck cavity 22c joints the head cavity 21b with the stem cavity.

The cam roller 50 rides on a flat cam face 51a of the cam 51 while the file 55 travels through the straight cylindrical bore 22a. As the file enters the tapered bore 22b, however, the roller 50 rides on a tapered cam face 51b thereby rocking the shaft 41 and causing the file to follow the contour of the tapered bore 22b. Then, as the file enters the outwardly flaring neck cavity 22c, the roller 50 rides onto a relieved portion 51c of the cam, thereby rocking the shaft in the reverse direction and causing the file to act on the outwardly flared neck cavity portion 22c.

As best illustrated in Figure 8, a file head 58 of the file 55 is urged so that the sharp shoulders 58a thereof cut into the bore 22a of the valve stem 22 along an axial band area or line of the bore while an opposed file head 58 acts on the opposite wall portion of the bore to be guided thereby and resiliently back up the active file head 58.

The apparatus 10 reciprocates the file 55 down through the entire length of the stem cavity and into the head cavity, as illustrated in Figures 4 and 5, while the cam faces guide the file so as to maintain the original contour of the bore. The degree of cutting by each reciprocal stroke of the file is determined by the spring pressure 43. Thus, the worm wheel 45 can be actuated so as to swing the shaft 41 for moving the file closer to the plane of the cam 51. Then, when the file enters the stem bore of the valve, it will be moved back against spring pressure and this spring pressure will act to cause a file head to bite into the wall of the bore with a predetermined amount of force.

Since the file heads are resiliently mounted, being on the ends of resilient fingers, they are stressed when inserted in the stem bore because the free state position of the file heads is somewhat greater in diameter than the position which these heads must assume when inserted in the stem bore. As a result, the active file head is not only stressed by itself, but is backed up by stressed file heads which serve to guide and hold the active head in proper position, causing it to follow the proper contour.

In some poppet valves, such as the valve 20 of Figures 7 to 9, the stem 22 has a straight cylindrical bore 22a extending directly to the outwardly flaring neck cavity 22c. When filing such valves, the tapered cam 51b is not used and the cam face 51a extends down to the relieved face portion 51c for permitting the file to follow the outwardly flared neck cavity 22c when it reaches this cavity. As shown in Figure 9, the file head 58 actually acts on this outwardly flaring neck cavity 22c and further the fingers 55d permit the expansion of the active head 58a to further follow the curved cavity 22c.

As shown in Figure 13, an alternative form of file 60 can be used. This file 60 is substantially the same as the file 55, identical parts being marked with the same reference numerals. In the file 60 the shank portion 55b has a bore 61 therethrough receiving a rod 62. The lower end of the rod 62 swively carries a tapered head 63 acting on tapered faces 64 in the fingers 55d.

A slot 65 is provided in the shank 55b and receives nut 66 which is threaded on the rod 62. The nut can thrust on the faces of the slot 65 and, when rotated, is effective to raise and lower the rod 62 thereby causing the head 63 to slide relative to the tapered faces 64 of the fingers 55d. This will move the fingers 55d apart and will permit them to come together as desired. As a result the fingers 55d can be spread in the nature of an expansible reamer. The amount of resilient backing up of fingers relative to the active cutting file head can thus be varied and controlled.

As shown in Figure 15, the valve blank 20 initially has annular scratches 70 in the bores 22a and 22b of the stem 22 and in the neck cavity or throat 22c caused by tools such as drills, reamers and the like, which scratches must be entirely eliminated to strengthen the valve. As shown in Figure 16, after a filing operation according to this invention, the annular scratches are all removed and are replaced with axial file marks 71. These axial file marks 71 extend throughout the straight cylindrical bore 22a, the tapered bore 22b, and the outwardly flaring neck cavity or throat 22c of the valve blank 20. As shown, the axial marks 71 flare outwardly as at 71a to follow the contour of the throat 22c.

As shown in Figure 17, if the valve 20 does not have a tapered bore portion, axial file marks 71 extend completely through the cylindrical bore and flare outwardly in the neck cavity or throat 22c as at 71a.

From the above descriptions it will be understood that the invention provides for the removal of all annular tool marks, scratches and the like from the interiors of hollow metal articles, such as the stems of hollow poppet valves. The method involves the filing by straight reciprocal or axial strokes of a file on a narrow band area of the surface being treated, alternated with relative rotation of the surface and file so that narrow axial band areas are successively treated until the complete periphery of the article has been filed. The file, according to this invention, is fed with the desired amount of pressure against the narrow band area on which it acts, and is resiliently mounted so that it can expand into an outwardly flaring portion and follow the contour of this portion for actually undercutting such a portion.

The removal of all annular tool marks, scratches and the like from the interior wall of hollow stem poppet valves, although causing removal of more stem metal, actually increases the life of hollow stemmed valves by removal of potential loci for fatigue cracks.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. The method of finishing the hole-defining wall of a hollow poppet valve stem including a portion of sharply varying diameter which comprises resiliently feeding a file longitudinally along and against one side of said wall under a controlled pressure for determining the depth of cut to be taken from said wall, guiding the file on the opposite side of said wall to constrain the file for following the hole, reciprocating the file relative to the valve for removal of metal from said wall and allowing radial expansion of said file to cut said portion of sharply varying diameter.

2. The method of strengthening hollow stemmed poppet valves which comprises successively reciprocally filing in an axial direction and under controlled selected pressure localized longitudinally extending narrow band areas of the hole-defining wall of a valve stem until the entire stem wall has been file-finished.

3. The method of file-finishing hollow stemmed poppet valves which comprises pressing a file against the hole-defining wall of a hollow valve stem, and rocking the thus pressed file against a template to follow the contour of the hole while reciprocating the file through the length of said hole.

4. The method of file-finishing the interior of a hollow stemmed poppet valve having a stem hole with a straight cylindrical portion, a tapered portion, and an outwardly flaring throat portion, which comprises pressing a file against a localized area of said cylindrical wall, reciprocating the thus pressed file along the entire length of said cylinder wall portion, rocking the file as it enters the tapered wall portion to follow the contour of said portion, and again rocking the file as it enters the outwardly flaring throat portion to undercut said throat portion, and repeating said reciprocating filing steps on successive adjacent narrow band areas of the wall portion until the entire stem interior is file-finished and free from annular scratches.

5. The method of finishing an inner wall of a hollow metal member having a portion of sharply varying diameter to remove annular scratches on said wall which comprises laterally pressing a file against a local narrow band area of said wall to follow the contour of the wall, filing with axially directed strokes said localized narrow band area of said wall, effecting relative rotation between said hollow member and said file, laterally pressing said file against the next narrow band area of said wall, filing with axially directed strokes said next adjacent narrow band area of the wall, and repeating said lateral pressing, filing, and rotating steps until the entire wall has been acted on by the file and annular scratches in the wall have been destroyed.

6. The method of increasing the fatigue resistance of annularly scratched hollow metal articles which comprises removing metal from scratched surfaces thereof by successively filing with axially-directed strokes longitudinally extending bands of the surface until all annular scratches are removed from said surface.

7. The method of finishing hollow poppet valves having stem cavities defined by scratched walls which comprises pressing a file laterally against a narrow band area of a scratch-containing wall in said stem cavity, reciprocating the file throughout the length of said wall, withdrawing the file from the valve, rotating the valve, reintroducing the file, pressing the file laterally against another band area of said wall in said stem cavity, and continuing said reciprocating, withdrawing, reintroducing, and rotating steps until all circumferentially extending scratches on said scratch-containing wall in said stem cavity have been destroyed.

JAMES G. STERLING.

REFERENCES CITED

The following references are of record in the file of this patent:

UNITED STATES PATENTS

| Number | Name | Date |
|---|---|---|
| 532,819 | Riddell | Jan. 22, 1895 |
| 888,041 | Salo | May 19, 1908 |
| 1,434,082 | Bossert | Oct. 31, 1922 |
| 1,770,458 | Castonguay | July 15, 1930 |
| 1,814,362 | Booth | July 14, 1931 |
| 2,115,461 | Hartmann | Apr. 26, 1938 |
| 2,189,659 | Arutunoff | Feb. 6, 1940 |
| 2,264,360 | Carlin | Dec. 2, 1941 |
| 2,313,442 | Kline | Mar. 9, 1943 |
| 2,333,985 | Clark | Nov. 9, 1943 |
| 2,349,994 | Snader | May 30, 1944 |
| 2,356,272 | Reynolds | Aug. 22, 1944 |

FOREIGN PATENTS

| Number | Country | Date |
|---|---|---|
| 11,626 | Great Britain | July 22, 1889 |
| 315,488 | Germany | Nov. 6, 1919 |
| 354,991 | Germany | June 17, 1922 |
| 552,048 | Great Britain | Mar. 22, 1943 |